UNITED STATES PATENT OFFICE 2,169,282

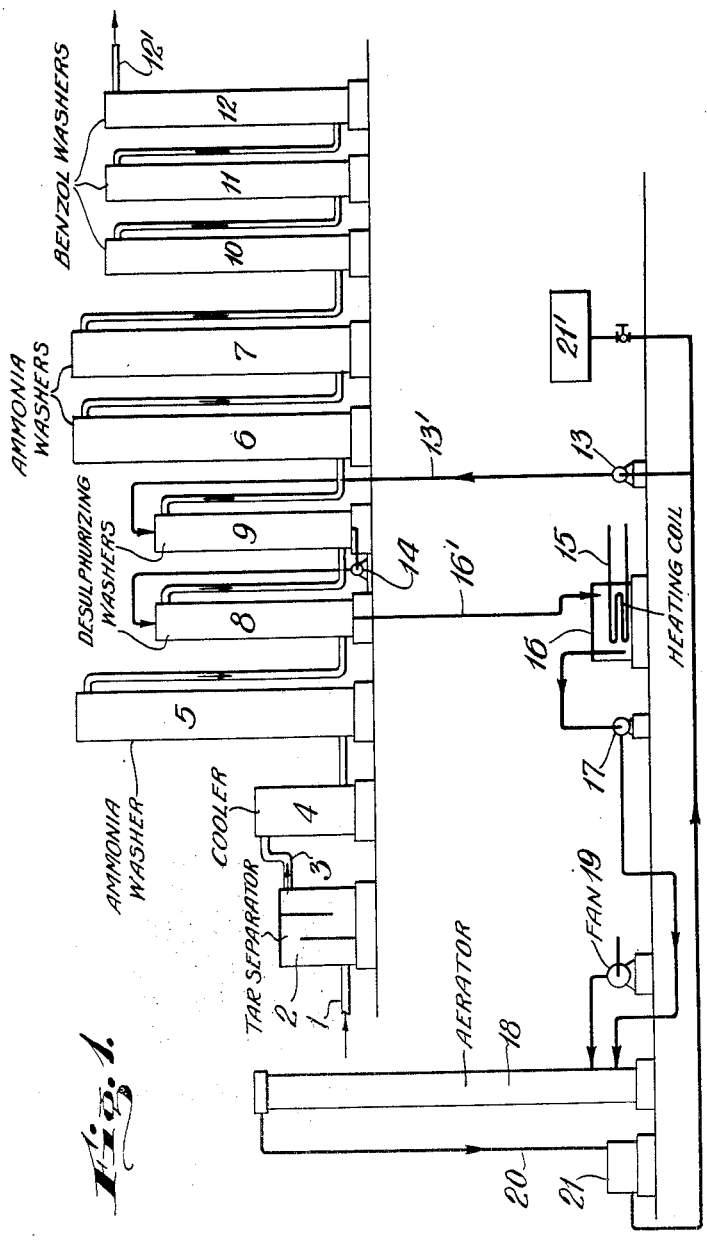

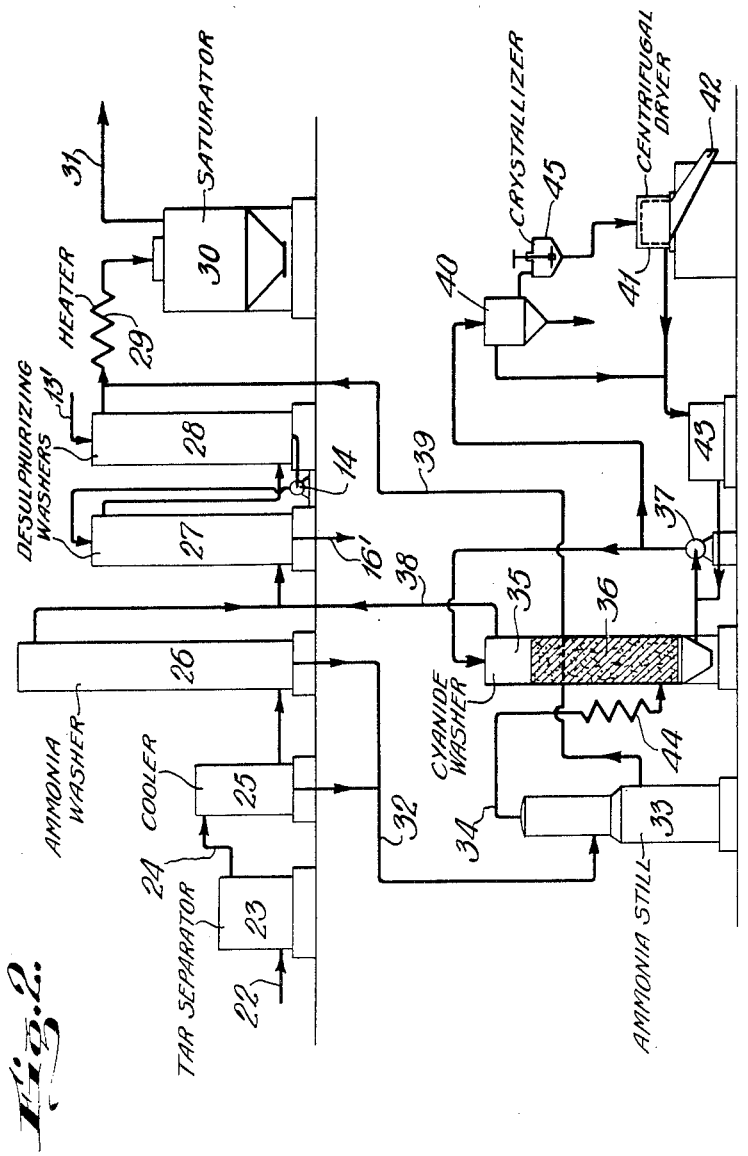

REMOVAL OF H₂S AND HCN FROM GASES

Honoré Alphonse Joseph Pieters, Heerlen, Netherlands, assignor of one-half to Dr. C. Otto & Company, Bochum, Germany, a German company, and one-half to Staatsmijnen in Limburg, Heerlen, Netherlands, a concern of the Netherlands Application June 2, 1937, Serial No. 145,991
In Germany June 12, 1936

5 Claims. (Cl. 23—3)

This invention consists in a wet process for washing sulphuretted hydrogen from gases and recovering the sulphur as free sulphur or as thiosulphate, and in a process for washing hydrogen cyanide from coal distillation gases and recovering it in the form of an alkali ferrocyanide. The processes are connected in that the sulphuretted hydrogen is washed from the gases by means of a suspension of a cyanogen compound which compound is preferably produced from the alkali ferrocyanide formed in the process for recovering the hydrogen cyanide.

Smith and Pryde (Gas Journal 1934, pages 307–309) state that sulphuretted hydrogen may be washed out of gases by passing the gases through a suspension of Prussian blue in a solution containing ammonia; the following two reactions are supposed to occur:

(1) $Fe_4(Fe(CN)_6)_3 + 2H_2S + 4NH_3 \rightarrow$
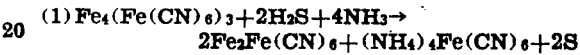
$2Fe_2Fe(CN)_6 + (NH_4)_4Fe(CN)_6 + 2S$ The washing agent leaving the washer has to be treated with oxygen, whereby the ferrous-ferrocyanide is reconverted into ferric ferrocyanide according to the equation:

(2) $2Fe_2Fe(CN)_6 + (NH_4)_4Fe(CN)_6 + O_2 \rightarrow$
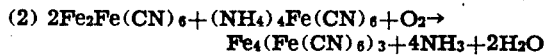
$Fe_4(Fe(CN)_6)_3 + 4NH_3 + 2H_2O$ Smith and Pryde state that a dilute solution of ferrous sulphate when brought into contact with coke oven gases will absorb ammonia and the hydrogen cyanide and will be converted into an ammoniacal suspension of ferrous ammonium ferrocyanide. For maintaining the correct composition of the washing agent during the treatment of the coke oven gas it is only necessary, according to Smith and Pryde, to add continuously ferrous sulphate to the solution, the amount necessary in the case of a gas having a content of sulphuretted hydrogen of 7 grams per cu. m. amounting to 5.6 grams of ferrous sulphate per cu. m.

My investigations have shown that the statements of Smith and Pryde are only partly true. The reaction between sulphuretted hydrogen and Prussian blue and the formation of elementary sulphur expressed by the first of the above equations and the regeneration of the washing agent expressed by the second equation proved it is true to be a principle on which it is possible to base a desulphurising process which has considerable advantage over the known processes. With that process only a short period of contact between the gas and the washing agent is required for a practically quantitative removal of sulphuretted hydrogen from the gas, and without polluting the atmosphere by the discharge of poisonous substances during the aeration, a high percentage of the sulphur present in the gas as sulphuretted hydrogen may be obtained in elementary form and can be easily worked up to pure sulphur.

However, Smith and Prydes' fundamental assumption that coke oven gas needs only to be brought into contact with a dilute solution of ferrous sulphate in order to obtain the ammoniacal suspension of ferrous ferrocyanide is incorrect. Not only will the desired suspension never be formed in this way, but even when starting with a washing liquor of the right composition, this composition cannot be maintained in the manner described by Smith and Pryde. For since the washing liquor contains ammonia and free sulphur, the hydrogen cyanide of the gas is fixed almost exclusively in the form of sulphocyanide, particularly ammonium sulphocyanide, NH₄CNS. I have found, for example, in following the procedure described by Smith and Pryde, that when treating a coke oven gas containing cyanogen corresponding to 0.6 gram of HCN per cu. m. the amount of ammonium sulphocyanide increased in 24 hours to the extent of about 0.5 kilo per cu. m. of washing liquor, the ratio of the volumes of washing liquor and gas passed through the washer being 3:100. With the Smith and Pryde procedure, only negligible quantities of complex ferrocyanide compounds are formed in the wash liquor, although the presence of those compounds is indicated by the greenish color of the liquor. However, the minute amount of active material formed, is of no practical importance in respect to the removal of the sulphuretted hydrogen from the gas.

What really happens when Smith and Pryde add ferrous sulphate only to the washing liquor, is the formation of a washing agent which is identical with the well-known suspension of iron hydroxide, which fixes the sulfur as ferrous sulphide. By aerating this washing liquor in the known manner it is regenerated and part of the sulphur is set free in elementary form. Compare Berichte der Gesellschaft für Kohlentechnick vol 2, part 2, page 108 ff., where the equations for this process are given as:

(3) $2Fe(OH)_3 + 3H_2S = 2FeS + S + 6H_2O$ (4) $2FeS + 3O + 3H_2O = 2Fe(OH)_3 + 2S$

In order to cover the losses of iron hydroxide in this process ferrous sulphate is regularly supplied to the washing liquor, exactly as in the process described by Smith and Pryde. E. g. in treating a gas having a content of sulphuretted hydrogen of 7 grams per cu. m. this supply amounts to 3.5 grams of ferrous sulphate per cu. m. of gas to be purified; this is even less than the amount of 5.6 grams of ferrous sulphate per cu. m. of gas to be purified required by Smith and Pryde.

It is the object of the present invention to provide a process for the removal of sulphuretted hydrogen from gases containing the same and whether gases contain hydrogen cyanide or not, not using the reactions of the Equations 3 and 4, as Smith and Pryde actually do, but substantially using the reactions of the Equations 1 and 2. Another object is to recover the sulphur either as free sulphur or as thiosulphate.

In order to produce the required suspension of Prussian blue and to maintain the desired composition of the washing agent the following procedure must be followed:

In proceeding in accordance with the invention, the wash liquor used should at all times contain ammonium salts in addition to ammonia and a suspension of ferrous ferrocyanide. Furthermore the losses of iron-ferrocyanide must be compensated by the addition of cyanide and ferrous salt, for example sodium ferrocyanide and ferrous sulphate, or of previously prepared finely divided iron ferrocyanide. It has been found namely that there is a continuous loss of a part of this suspended active material; in the treatment of coke oven gas an automatic renewal of the iron ferrocyanide by the addition of ferrous sulphate alone is not effected. It may also be necesary to add to the ammoniacal liquor which serves as the washing agent, an ammonium salt, for instance ammonium sulphate or chloride, to keep the ammonium content of the wash in a suitable stabilizing proportion to the content of the Prussian blue suspended in the washing liquor. It is known that the complex iron cyanide compounds are decomposed with separation of iron hydroxide in an aqueous solution of ammonia of that degree of alkalinity which is necessary for satisfactorily absorbing sulphuretted hydrogen. Such decomposition may be avoided, and the active colloidal dispersion of the complex iron cyanide compound in such an aqueous ammonia solution may thus be stabilized, by dissolving in the solution, an ammonium salt such as ammonium sulphate or ammonium chloride; the proportion of this indispensable ammonium salt is dependent on the quantity of the suspended iron cyanide compound and on the ammonia content of the liquor.

The desired concentration of the ammonium salts must be maintained during the operation and the inevitable losses must be covered. There are cases in which the ammonia content of the gas, owing to secondary reactions, covers the loss of ammonium salts during the working. There are even cases in which during the working the content of ammonium salt rises; in these cases it is necessary to decrease the concentration of ammonium salt from time to time, for example by diluting the solution. Both cases may occur when treating hydrogen-cyanide-containing coal distillation gases and, as will be explained presently, more especially under those conditions, whereby the sulphuretted hydrogen is converted in part, not to elementary sulphur, but to ammonium thiosulphate. In cases in which the formation of ammonium salts due to secondary reactions is not sufficient the continuous addition, in suitable quantities, of ammonium salts, for instance ammonium sulphate or ammonium chloride, or of substances from which ammonium salts can be formed, is necessary.

In the above described washing operation the ammonia dissolved in the liquor, first combines with the sulphuretted hydrogen, for example in the form of ammonium sulphide or ammonium hydrosulphide, and this reacts in the solution with the ferric ferrocyanide to produce ferrous ferrocyanide, ammonium ferrocyanide and elementary sulphur. In practicing the process, the gas to be treated and the washing agent are passed in counter-flowing currents through one or more washers, and the liquor, preferably heated to about 40° C., is then treated with air which regenerates the liquor and floats the sulphur. The liquor may then be collected in a tank in which the suspended sulphur separates. The regenerated liquor is returned to the washer.

The washing liquor is blue when it leaves the aerator and yellow when it leaves the washer. When working conditions are correct the liquor contains as solid undissolved constituents only the complex iron cyanide and the precipitated sulphur.

The sulphur obtained in the form of foam contains from 50–80 per cent of water, ammonium salts and a small portion of the iron cyanide complex. These substances may be in greater part removed by washing with water and returned to the washing liquor; the iron cyanide complex and the ammonium salt which is not recovered, must be replaced, as previously stated.

A part of the sulphuretted hydrogen is oxidised to thiosulphate; this reaction is favoured when the concentration of iron cyanide complex and of ammonia in the washing liquor are low. Hydrogen cyanide, when present, is in greater part converted into sulphocyanide. Both the gas to be purified and the air used for oxidising the washing liquor carry away a certain quantity of ammonia from the washing liquor. It will be clear that ammonia losses cannot be avoided. In order to maintain the necessary ammonia-concentration of the liquor a quantity of ammonia corresponding to these losses must be supplied, if necessary, by adding ammonia to the gas or to the liquor. When the ammonia content of the gas is too high the excess has to be removed.

The process may be so conducted that practically all the sulphur is obtained in the form of thiosulphate, since by giving the ammonium-sulphide formed in the washer sufficient time to react with the suspended sulphur, a polysulphide is produced. By the subsequent aeration of this solution the polysulphide is oxidised to thiosulphate instead of sulphur.

The following examples illustrate the invention:

Example 1

250 cu. m. per hour of coke oven gas containing 7 grams of $H_2S$ and 0.6 gram of HCN per cu. m. are treated in counter-current with the washing liquor and the latter is continuously regenerated by aeration.

In preparing the washing liquor, a solution is made of 450 grams of potassium ferrocyanide (or the corresponding quantity of the sodium or ammonium salt) in 12 litres of water. To this solution are added 100 litres of an ammonium sulphate solution of 25 per cent. strength, 30 litres of an ammonia solution of 25 per cent. strength and 1.1 litres of 2N ferrous sulphate. The precipitate which is formed becomes blue by the oxidising action of the air. This colloidal liquid is diluted with water to 1 cu. m. and is treated with air in the aerator. In this manner the formation of ferric hydroxide is avoided.

In Example 1, the amount of liquor in circulation is 8 cu. m., the throughput being 5 cu. m. per hour. The liquor flows through two washers in series, each 4.8 m. high and of a diameter of 0.5 m. and filled with Raschig rings. The liquor flows into a settling tank from which it passes to a pre-heater 3 m. high and of a diameter of 0.8 m. into the aerator which is of the same diameter as the pre-heater and which is 10 m. high. The air is introduced at the bottom of the aerator. The temperature of the liquor in the washer is about 25° C., and in the aerator about 40° C. The presence of the ammonium salts has an unexpectedly favourable influence on the uniform distribution of the air in the aerator.

The separated sulphur is treated with water and then dried. It then contains about 96 per cent. of sulphur, the rest being ammonium salts and complex iron cyanide compounds. If the latter are not recovered from the sulphur, for example by washing the crude sulphur with dilute caustic soda lye, to the washing liquor must be added per cu. m. of gas to be purified 0.2 gram of ferrous sulphate and 0.35 gram of potassium ferrocyanide (assuming the above given content of 7 grams of sulphuretted hydrogen per cu. m. of gas).

About 80 per cent. of the sulphuretted hydrogen in the gas is oxidised to sulphur, the remaining 20 per cent. being transformed into thiosulphate and sulphocyanide. The quantity of air necessary for revivifying the washing liquor amounts to about 10 per cent. of the volume of the gas to be purified.

In the mode of operating described above the amount of the liquor circulating is about 3 per cent. of the volume of the gas to be purified in the same time. The sulphuretted hydrogen is quantitatively removed from the gas, the hydrogen cyanide for about 90 per cent. When the quantity of the circulating liquor is relatively smaller the washing effect is diminished and when the volume of the liquor amounts to 1 per cent. of the gas it is about 99 per cent. On a reduction in the amount of circulating liquor in use, the concentration of the ammonia in the liquor must be increased, and on an increase in said amount, the ammonia concentration must be decreased.

*Example 2*

The coke oven gas to be washed has the same composition as that used in Example 1, also the arrangement of the apparatus is the same. The throughput of the washing liquor is reduced to 1-2 cu. m. per hour and the regenerating air is introduced at a point which is about 3-5 m. higher, so that the liquor remains unaerated for a longer period. Owing to this rearrangement practically no sulphur is separated, the sulphuretted hydrogen being practically completely converted to thiosulphate (and sulphocyanide).

Hydrogen cyanide has hitherto been recovered from coal gases only by working up the Prussian blue contained in spent dry purifier mass to potassium ferrocyanide. So far as HCN has been removed from distillation gases containing oxygen, for instance coke oven gas, by a wet process it is transformed into sulphocyanide.

By the present invention the hydrogen cyanide is recovered by a wet process not, however, directly from the distillation gases but from the ammoniacal gas liquor which is produced by cooling the distillation gases or from the gas liquor produced by washing these gases with water, or from both liquors. In order to recover the ammonia in these liquors they are distilled. The vapours contain hydrogen cyanide, sulphuretted hydrogen and carbon dioxide in addition to the ammonia. In this invention it is not the coal gas itself but the vapours above referred to from which the hydrogen cyanide is recovered by washing with a solution of alkali carbonate or alkali hydroxide or both in the presence of iron or an iron salt. The iron may be used in the form of waste iron, for example iron dust or iron filings. At will potassium-, sodium- or K-Na-ferrocyanide may be obtained by using a washing liquor containing the corresponding alkali carbonates. It is also possible to obtain the corresponding ammonium salt; the ammonia necessary in this case is generally present in sufficient quantity in the vapours leaving the ammonia still.

When using metallic iron insoluble matter accumulates in the washing liquor. This residue has to be removed before working up the solution. In order to obtain solutions of alkali ferrocyanide as concentrated as possible it is advantageous to wash out the hydrogen cyanide at a high temperature; for the solubility of the alkali ferrocyanide increases with the temperature. For example, at a temperature of 95° C. the solution may contain about 500-600 grams of sodium ferrocyanide per litre.

In order to avoid condensation of water from the vapours and thereby a dilution of the washing liquor the vapours are pre-heated before passing into the liquor.

If in addition to the described washer an acid washer is used for removing the ammonia carried by the vapours, it is preferable that the hydrogen cyanide washing precedes the acid washing.

In the HCN-washer not only the waste iron which has been added to the liquor is dissolved but also the iron of the walls of the vessel is attacked. It has been found that even irons and iron alloys of high resistance are subject to considerable corrosion; it is therefore economical to use vessels having cast iron walls.

It is known that the addition of the corresponding carbonate or hydroxide to a solution of alkali ferrocyanide considerably diminishes the solubility of the latter. The recovery of the alkali ferrocyanide in a solid form can therefore be favoured by adding the corresponding alkali carbonate or hydroxide to the liquor withdrawn from the washer; the cyanogen compound is thereby separated and the washing liquor regenerated in respect of its content of alkali.

In combination with the process for recovering sulphur described above it is possible to use the alkali ferrocyanide in a dissolved form. When both the new processes, namely that for recovering sulphur and that for recovering hydrogen cyanide, are used in one plant it is advisable to compensate the working losses of the first process using an adequate part of the liquor withdrawn from the cyanogen washer. The alkali ferrocyanide not used for making up the washing agent in the desulphurising process is preferably recovered in the solid form.

The new process for recovering hydrogen cyanide is simple to operate and may be easily carried out in existing plants. It only requires a cheap and simple apparatus, it needs little superintendence and it is very economical in respect to the consumption of chemicals. The process is applicable to any gases containing hydrogen cyanide and ammonia, irrespective of the presence of oxygen.

In the accompanying drawings, Fig. 1 is a diagrammatic representation of one form, and Fig. 2 is a diagrammatic representation of a second form, of apparatus adapted for use in the practice of the invention claimed herein.

The apparatus shown in Fig. 1 is of the type in which ammonia is separated from the gas by the so-called "indirect" process. The hot raw gas to be treated is passed by a pipe 1 into a tar separator 2, and thence through the pipe 3 into a cooler 4, from which the gas passes into a primary ammonia washer 5. The gas is then passed in series through desulphurizing washers 8 and 9. The gas then passes through a secondary ammonia washer comprising two scrubbing towers 6 and 7, from which the gas passes to benzol washers 10, 11 and 12. The purified gas leaves the apparatus shown in Fig. 1, through pipe 12' connected to the gas outlet of the benzol washer 12.

The special wash liquid employed in accordance with the present invention to wash the hydrogen sulphide out of the gas, is passed through pipe 13' into the top of the desulphurizing washer tower 9, by a pump 13, and is passed from the bottom of the tower 9 to the top of the washer tower 8 by a pump 14. The liquid collecting in the bottom of the tower 8 passes through a pipe 16' to a heater or preheater 16, diagrammatically shown as including a steam coil 15. From the heater 16, the liquid is passed by the pump 17 into the bottom of the aerator tower 18, into the lower end of which atmospheric air is forced by a fan 19. Liquid and liberated sulphur pass from the top of the aerating tower 18 to a separating vat 21. The liquid separating from the sulphur in the vat 21, is drawn by the pump 13 from the latter. Liquid drawn from a receptacle 21' may be added to the liquid drawn from the vat 21, as required for the delivery of liquid of the proper composition to the washer 9. The location of the sulphur washers 8 and 9 between the primary ammonia washer 5, and the secondary ammonia washers 6 and 7, facilitates the maintenance in the gases passing to the sulphur washing apparatus, of the moderate ammonia content desirable for the purposes of the present invention.

With the apparatus shown in Fig. 2, the ammonia is separated from the gas by the so-called "semi-direct" process, the hot raw gas being initially passed by a pipe 22 into a tar separator 23. From the tar separator 23, the gas passes through a pipe 24 to a cooler 25 and thence to an ammonia washer 26. The gas outlet from the latter leads to the desulphurizing washing apparatus shown as comprising two towers 27 and 28 through which the gas passes in series. From the gas outlet of the tower 28, the gas passes through a heater 29 to the saturator 30, in which the ammonia is converted into ammonium sulphate. The gas passes away from the saturator 30, through the pipe 31, which may lead to benzol recovery apparatus, not shown in Fig. 2.

The liquid collecting in the lower portions of the cooler 25 and ammonia washer 26, passes through the pipe 32 to the distilling column 33, from which all or the major portion of the ammonia vapors formed, pass through the pipe 34 and heated 44 to the cyanide washer 35. The latter comprising a pervious mass 36 of ferric material, ordinarily iron filings, onto which a caustic solution, for example, potassium hydroxide, is sprayed by means including a recirculating pump 37 having its inlet connected to the lower end of the cyanide washer. Vapors pass from the cyanide washer 35 through the pipe 38 to the inlet of the first sulphur washer 27. Potassium ferrocyanide is separated from the liquid recirculated through the cyanide washer 35, by passing liquid from time to time from the recirculating system into a tank 40, having upper and lower level outlets. The lower level outlet is connected to a crystallizer 45. The latter includes a stirrer and discharges into a centrifugal drier 41, from which dried crystallized material passes away through a chute 42, and liquid passes to a reservoir 43. The latter also receives liquid from the upper level outlet of the tank 40, and from reservoir 43 liquid is returned to the circulating system at the inlet side of the pump 37.

The potassium hydrate or other caustic material which is needed to regenerate the wash liquid sprayed into the cyanide washer may be passed into the tank 40, thereby favoring the precipitation of ferro-cyanide in the tank 40 and crystallizer 45. Excess ammonia vapors may pass from the column 33 to the inlet side of the reheater 29 and thence to the saturator 30. The desulphurizing washers 27 and 28 of Fig. 2 may be associated through pipes 13' and 16' with wash liquid regenerating means including an aerator, as are the washers 8 and 9 of Fig. 1.

What I claim is:

1. The method of separating sulphuretted hydrogen from gases, which consists in washing the gases with an aqueous ammoniacal solution initially containing iron ferrocyanide in suspension and having an ammonium salt content required to stabilize said ferrocyanide suspension against decomposition, regenerating the solution following its use and preparatory to its reuse in the washing operation by aerating the same, and compensating for the wastage of iron ferrocyanide from the solution, by adding thereto finely divided material from the group consisting of (1) iron ferrocyanide, and (2) cyanides and iron salts.

2. A process as set forth in claim 1, in which the ammonium salt content of the washing solution is increased when necessary to maintain said content at the level required for the stabilization of the iron cyanide compounds in the solution, by the addition to said solution of material from the group consisting of ammonium salts and substances forming said salts when added to the solution.

3. A process as set forth in claim 1, in which the wash solution is regenerated at a temperature of about 40° C.

4. A process of treating coal distillation gases for the recovery therefrom of hydrogen cyanide in the form of alkali ferrocyanide and for the elimination from the gases of sulphuretted hydrogen, which consists in separating an ammoniacal liquor containing hydrogen cyanide from said gases, vaporizing said liquor and washing the vapors thereby formed with a wash liquid containing material from the group consisting of iron and iron salts, and also containing material from the group consisting of alkali carbonate and hydroxides, and in thereupon washing the coal distillation gases with an aqueous ammoniacal solution which contains iron ferrocyanide in suspension and which has an ammoniacal salt content required to stabilize said ferrocyanide suspension, regenerating the solution following its use and preparatory to its reuse in the last mentioned washing operation by aerating the same, and in compensating for the wastage of iron ferrocyanide from said solution by adding thereto a portion of the above mentioned wash liquid following its use in washing the above mentioned vapors.

5. A process of treating coal distillation gases for the recovery therefrom of hydrogen cyanide in the form of alkali ferrocyanide and for the elimination from the gases of sulphuretted hydrogen, which consists in separating an ammoniacal liquor containing hydrogen cyanide from said gases, vaporizing said liquor and washing the vapors thereby formed with a wash liquid containing iron or an iron salt and also containing a material from the group consisting of alkali carbonates and hydroxides and in thereupon washing the coal distillation gases with an aqueous ammoniacal solution which contains iron ferrocyanide in suspension and which has an ammoniacal salt content required to stabilize said ferrocyanide suspension, regenerating the solution following its use and preparatory to its reuse in the last mentioned washing operation by aerating the same, and in compensating for the wastage of iron ferrocyanide from said solution by adding thereto a portion of the above mentioned wash liquid following its use in washing the above mentioned vapors, and in separating alkali ferrocyanide in solid form from the remainder of the above mentioned wash liquid, by the addition to the latter of a material from the group consisting of alkali hydroxides, alkali carbonates and mixtures thereof.

HONORÉ ALPHONSE JOSEPH PIETERS.